United States Patent [19]
Karten et al.

[11] Patent Number: 5,553,820
[45] Date of Patent: Sep. 10, 1996

[54] ADJUSTABLE MONITOR ARM

[75] Inventors: Stuart Karten, Venice; Dennis Schroeder, Hermosa Beach, both of Calif.

[73] Assignee: Rubbermaid Office Products Inc., Maryville, Tenn.

[21] Appl. No.: 322,479

[22] Filed: Oct. 17, 1994

[51] Int. Cl.$^6$ ..................................................... A47F 5/00
[52] U.S. Cl. .................................. 248/286.1; 248/181.2; 248/276.1; 248/921
[58] Field of Search ............................. 248/278.1, 279.1, 248/349, 917, 919, 920, 921, 922, 923, 231.71, 276.1, 286.1, 184.1, 181.2; 403/90, 122

[56] References Cited

U.S. PATENT DOCUMENTS

| | | | |
|---|---|---|---|
| D. 275,431 | 9/1984 | Usab | D6/429 |
| D. 311,829 | 11/1990 | Vossoughi | D6/418 |
| D. 325,868 | 5/1992 | Bartok | D8/380 |
| D. 342,173 | 12/1993 | Kirchner et al. | D6/511 |
| 1,685,103 | 9/1928 | Taigman | 248/660 |
| 2,301,661 | 11/1942 | Wiedenhoeft | 248/281 |
| 2,395,178 | 2/1946 | Fiori | 248/280 |

(List continued on next page.)

OTHER PUBLICATIONS

Magazine page, Monitor arm; Anthro Technology Furniture, 3221 N.W. Yeon Street, Portland, Oregon 97210. Published in "Design News" of Mar. 13, 1989.

Pp. 16 and 17, Monitor arms; Curtis Manufacturing Company, Inc., 30 Fitzgerald Drive, Jaffrey, New Hampshire 03451–1931. Publication date 1993.

Page 128, Monitor arms; Misco, One Misco Plaza, Holmdel, New Jersey 07733. Publication date Spring, 1993.

Catalog page, Monitor arms; Misco, One Misco Plaza, Holmdel, New Jersey 07733. Publication date Spring, 1993.

Pp. 80 and 81, Monitor arms; Global Computer Supplies, 2318 East Del Amo Boulevard, Dept. 34, Compton, California 90220. Publication date Oct., 1992.

Catalog page, Monitor stand; MicroComputer Accessories Inc., 5405 Jandy Place, P.O. Box 66911, Los Angeles, California 90066. Publication date 1990.

Catalog page, Monitor stand; MicroComputer Accessories Inc., 5405 Jandy Place, P.O. Box 66911, Los Angeles, California 90066. Publication date 1990.

Catalog page, Monitor stand; MicroComputer Accessories Inc., 5405 Jandy Place, P.O. Box 66911, Los Angeles, California 90066. Publication date 1990.

*Primary Examiner*—Karen J. Chotkowski
*Attorney, Agent, or Firm*—Richard B. O'Planick; Lisa B. Riedesel

[57] ABSTRACT

A monitor support arm assembly is disclosed comprising a support arm (14), a socket member (38) affixed to a remote end of the support arm, the socket member creating a concave central cavity (84), and an elongate slot (74) extending through support arm and communicating with the socket member cavity (84). An adjustable tray (12), having a concave lower surface (54), seats within the socket member cavity (84) and has an elongate slot (52) extending therethrough that overlaps the first mentioned support arm and socket member slot (74). A friction pad (40) of arcuate shape is affixed to an underside of the support arm (14) and has a through slot (92) that aligns with the support arm slot (74), and a downwardly facing arcuate bearing surface (88). A locking screw shall (98) extends through the friction pad slot (92), and the overlapping support arm and socket member slot (74), and through the tray slot (52) to assemble the components together. Adjustment of the angular position and pitch of the tray (12) is accomplished by loosening the screw, and pivoting the tray concave lower surface (54) within the socket member cavity. The screw shaft (98) travels along the overlapping slots as the adjustment is made and along the friction pad arcuate outer surface (88), which serves to alter the direction in which the screw shaft (98) projects as it moves along the slots (92,74) so that the shaft (98) is always perpendicular to the portion of the bearing surface (54) through which it extends.

23 Claims, 7 Drawing Sheets

U.S. PATENT DOCUMENTS

| | | | |
|---|---|---|---|
| 2,400,224 | 5/1946 | Christensen et al. | 248/660 |
| 2,893,674 | 7/1959 | Monaco | 248/183 |
| 2,911,525 | 11/1959 | Strom | 240/41.15 |
| 3,774,873 | 11/1973 | Krogsrud | 248/280 |
| 3,856,251 | 12/1974 | Miller | 248/280 |
| 3,974,994 | 8/1976 | Petterson | 248/921 X |
| 4,003,536 | 1/1977 | Sekerich | 248/280 |
| 4,068,961 | 1/1978 | Ebner et al. | 248/921 X |
| 4,314,319 | 2/1982 | Terry et al. | 362/287 |
| 4,328,536 | 5/1982 | Wallmark | 362/427 |
| 4,483,503 | 11/1984 | Gahan | 248/921 X |
| 4,494,177 | 1/1985 | Matthews | 362/402 |
| 4,562,987 | 1/1986 | Leeds et al. | 248/278 |
| 4,568,052 | 2/1986 | Solomon et al. | 248/281.1 |
| 4,591,122 | 5/1986 | Kreuzer | 248/280.1 |
| 4,620,808 | 11/1986 | Kurtin et al. | 400/83 |
| 4,687,167 | 8/1987 | Skalka et al. | 248/282 |
| 4,691,886 | 9/1987 | Wendling et al. | 248/183 |
| 4,695,024 | 9/1987 | Haven | 248/281.1 |
| 4,708,312 | 11/1987 | Rohr | 248/919 X |
| 4,974,808 | 12/1990 | Ball | 248/917 |
| 4,989,813 | 2/1991 | Kim et al. | 248/920 X |
| 5,033,707 | 7/1991 | Strater et al. | 248/284 |
| 5,123,621 | 6/1992 | Gates | 248/281.1 |
| 5,240,215 | 8/1993 | Moore | 248/278 |
| 5,277,392 | 1/1994 | Rossman et al. | 248/919 X |
| 5,398,901 | 3/1995 | Brodmann et al. | 248/921 X |

ADJUSTABLE MONITOR ARM

BACKGROUND OF THE INVENTION

1. Field of the Invention

The present invention relates generally to adjustable support arm assemblies for repositioning items carried at one end in a three dimensional envelope, and more particularly to such assemblies which have the particular application of repositioning a computer monitor to suit the preference of the user.

2. The Prior Art

Computer monitor support arm assemblies are well known accessories for computer systems. An objective of some such assemblies is to support a computer monitor at one end and to provide adjustment means for moving the monitor within a three-dimensional envelope and also to permit tilt adjustment of the monitor about a vertical axis. The arm assemblies are typically used for moving the monitor toward and away from the user, and repositioning the monitor to suit the preference of the user, and freeing up space on the workstation surface.

One such monitor assembly is sold by MicroComputer Accessories Inc. as Product No. 641K. The support arm extends upward from a pivotal base and supports a horizontal beam at a remote end. The beam reciprocally moves back and forth on rollers and includes a plate member at one end for supporting a monitor. In addition, the beam member has a pivoting linkage which adjusts as the support arm is raised and lower to maintain the horizontal beam in a horizontal disposition. Thus the monitor plate can be raised and lowered and rotated 360 degrees by movement of the support arm, and can be adjusted in and out by movement of the horizontal beam.

Other representative assemblies are the MicroComputer Accessories, Inc. Model Nos. 6150 and 6130. The 6150 has a vertical post mounted to a clamp base. The arm has an integral vertical sleeve, and slides down onto the post when the user is assembling the unit. In addition there are three stacking rings which slide down onto the post. The user configures the arm with 0,1,2, or 3 rings under the arm on the post to obtain one of the four height positions. If the arm is placed at any position other than the highest position, the extra rings are slid onto the post above the arm.

The 6130 and 6150 have identical trays attached to the end of the arm. The trays pivot and tilt and there is a slot in the tray similar to that described above for the 641K.

In order to add further adjustability to the assembly, a turntable is mounted on the support plate. The turntable includes a top platform having a semi-spherical center bottom portion, and a stand for supporting the platform. The stand includes a semi-spherical recess in an upper surface for receiving the platform semi-spherical bottom portion, and an aperture extends through the stand bottom to communicate with the stand recess. The platform has an arcuate slot or a series of holes extending through the bottom center portion which aligns with the stand aperture. A lock screw is provided to project upward through the stand aperture and the platform slot (or one of the apertures), and a clamping nut attaches to the lock screw end to hold the assembly together and in a fixed mutual orientation.

The turntable can be adjusted to rotate 360 degrees and/or to tilt forward and backward along the platform slot by loosening the clamping nut, whereby freeing the platform to rotate within the stand recess and to tilt forward and backward. After the desired positioning of the platform has been achieved, the clamping screw is tightened to fix the turntable in its preferred position.

U.S. Pat. No. 5,123,621 teaches a monitor support assembly which includes a pivot axis at the base, a secondary intermediate pivot axis which serves to keep an intermediate arm member level, and a tilting support plate at a remote end of the arm member. The support plate includes a slot adjustment mechanism for tilting the monitor in one direction.

While the aforementioned prior art arm assemblies work well and has been commercially well received, certain shortcomings prevent them from satisfying all of the needs of the market. First, the apparatus are relatively complex, requiring a plurality of pivot adjustment mechanisms to place the monitor in its desired altitude, and rotational and attitudinal positions. The complexity of the arm linkages and associated hardware increases the cost of the assemblies, increases the burden and cost of their manufacture and assembly. Moreover, such assemblies are more complex and time consuming to adjust than desired by the end user.

SUMMARY OF THE INVENTION

The present invention overcomes the aforementioned deficiencies in state of the art monitor arm assemblies by providing a mechanism which accomplishes a substantial degree and freedom of adjustment at substantially reduced cost of manufacture and assembly. The mechanism comprises a pivotal support base from which a support arm extends. A socket member is affixed to a remote end of the support arm, and is configured to provide a central concave cavity. An elongate slot extends through the bottom surface of the support arm and communicates with the cavity.

An adjustable tray, on which a monitor is positioned, is further provided having a concave lower surface that seats within the socket member cavity. The tray lower surface further includes an elongate slot therethrough that overlaps the support arm slot. A friction pad having a planar top surface and an arcuate bottom surface and an arcuate throughslot is affixed to the underside of the support arm. A locking screw extends through both of the overlapping slots and clamps the tray to the socket member and the friction pad in the desired position.

The arm is pivotal about the support base and can be elevated into alternative angular orientations. The user adjusts the pitch and rotational orientation of the monitor by first releasing the clamping screw and then manipulating the tray into its desired position. The clamping screw travels along the overlapping slots as the tray is repositioned. Once the final position is achieved, the clamping nut is reset and the tray and socket are clamped thereby in a fixed attachment.

Accordingly, is an objective of the present invention to provide an adjustable support arm assembly capable of three dimensionally adjusting the position of a monitor.

A further objective is to provide a support arm assembly that comprises relatively few parts and which is economical to manufacture and assemble.

Still a further objective is to provide a support arm assembly that facilitates simultaneous pitch and roll adjustment of a monitor screen.

Yet another objective is to provide a support arm assembly capable of three dimensionally repositioning a monitor screen with relatively few adjustments.

A further objective is to provide a support arm assembly which is readily manufactured of conventional materials, readily assembled, and which requires a low level of maintenance.

These and other objectives, which will be apparent to one skilled in the art, are achieved by a preferred embodiment which is described in detail below and which is illustrated by the accompanying drawings.

DESCRIPTION OF THE PREFERRED EMBODIMENT

Figure 2:
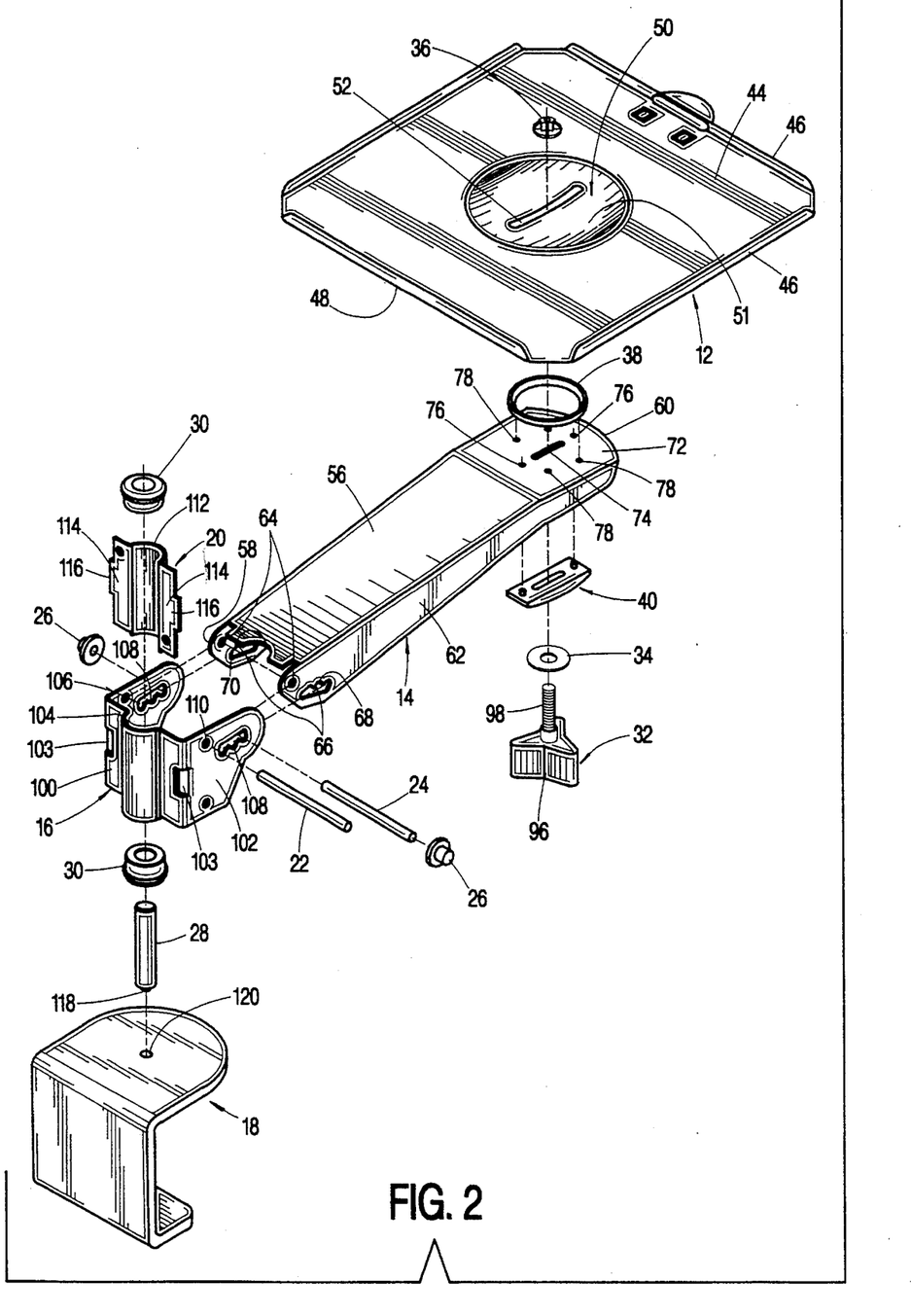
FIG. 2 is an exploded perspective view thereof.
Figure 3:
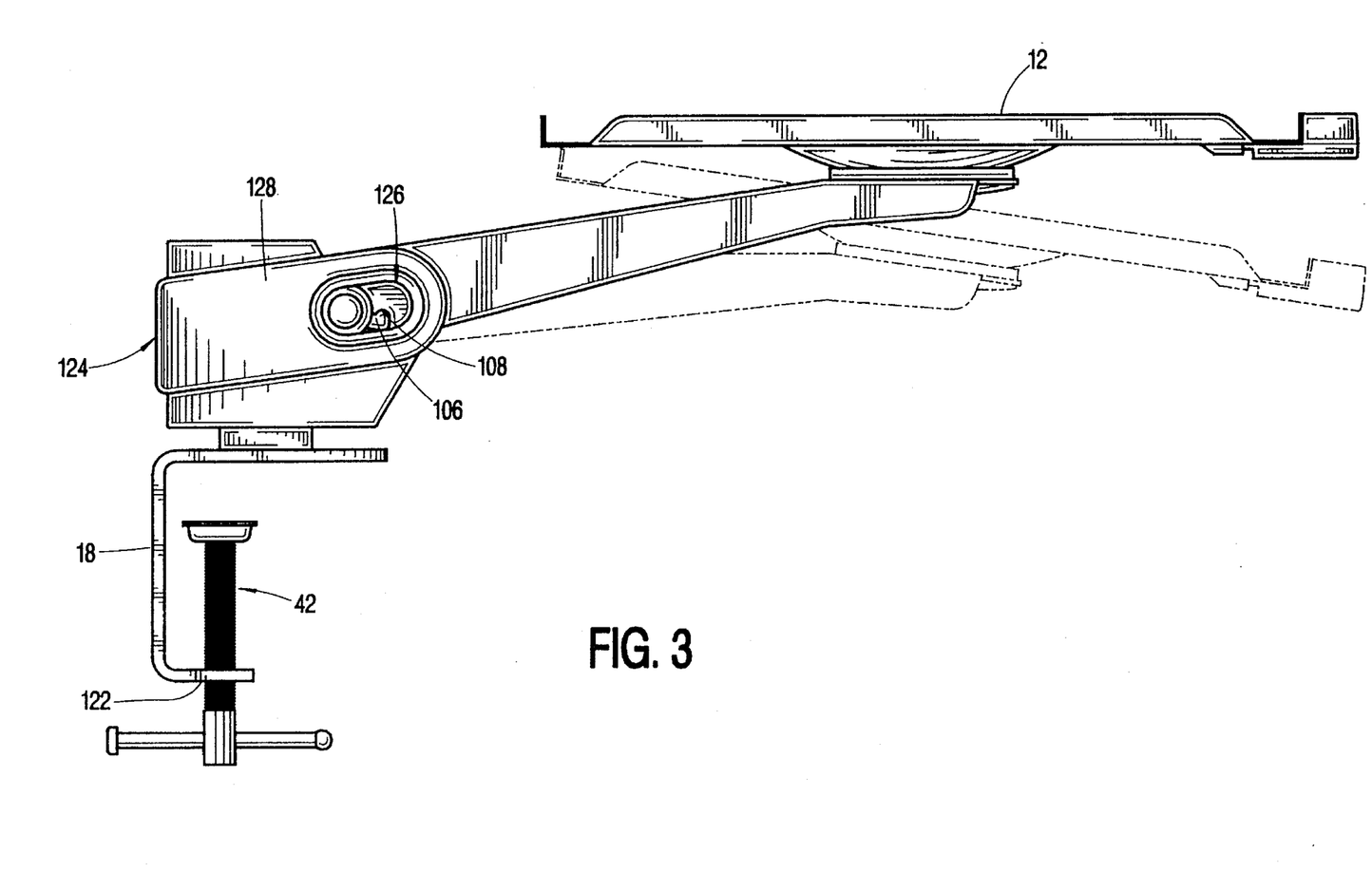
FIG. 3 is a side elevation view thereof.
Figure 4:
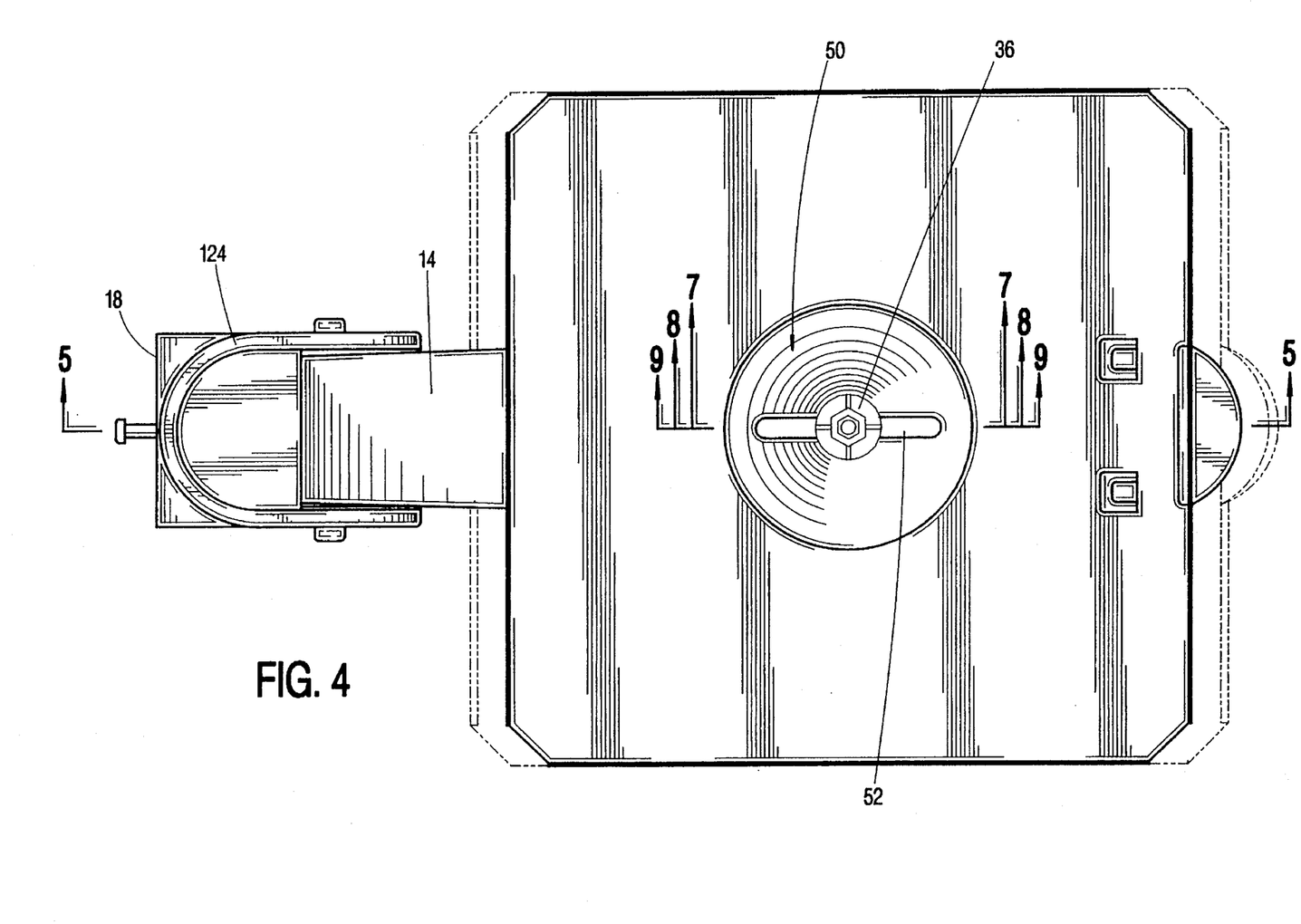
FIG. 4 is a top plan view thereof.

Referring first to FIGS. 2 and 3, the subject support assembly 10 is shown to comprise the following primary components: a generally square tray member 12; an elongate arm member 14; a U-shaped support bracket 16; a U-shaped mounting bracket 18; a clamping bracket 20; a pivot pin 22 and a lock pin 24. Retention caps 26 are provided to fit over the ends of the lock pin 24. A cylindrical swivel pin 28 is a further component, and spacer bushings 30 are provided to fit over ends of the pin 28. A handled clamping screw 32, washer 34, and clamping nut fastener 36 are included in the assembly. A circular socket ring 38 mounts to the arm 14, and a friction pad 40 mounts to the underside of the arm 14, opposite the ring 38. As shown by FIG. 3, a vertically oriented clamping screw 42 extends through the mounting bracket 18 and is used to clamp the assembly to the edge of a work surface. The primary components are composed preferably from metallic materials, stamped and formed pursuant to conventional methods.

The support tray member 12 is square shaped, and includes an upper surface 44 for supporting a computer monitor or the like. The tray member 12 has upwardly formed edge flanges 46 to confine the monitor to the top surface 44, and a generally planar bottom surface 48. A central concave cavity 50 is positioned centrally within the top surface 44, defined by smooth radiussed sidewalls 51. An elongate through slot 52 bisects the cavity 50 and extends through the tray member 12. The presence of the cavity 50 on the top of the tray creates a convex bearing surface 54 that extends downward from the tray underside 48. The bearing surface 54 is smooth and continuous.

Continuing with reference to FIGS. 2 and 3, the arm member 14 is generally rectangular in top plan view, having a planar top surface 56 that extends from a first, lower arm end 58 to a second, upper arm end 60. Downturned sides 60 extend from outer edges of the top surface 56 and extend from end to end of the arm. Aligned pivot pin holes 64 extend through the arm sides 60 proximate the lower end 58, and adjacent thereto are aligned lock pin apertures 66 that likewise extend through the arm sides 60. The lock pin apertures 66 are elongate and are defined along an upper edge by a series of lock pin receiving sockets 68. A semicircular cutout 70 is provided at the lower end 58, within the lower edge of the top surface 56.

Figure 6:
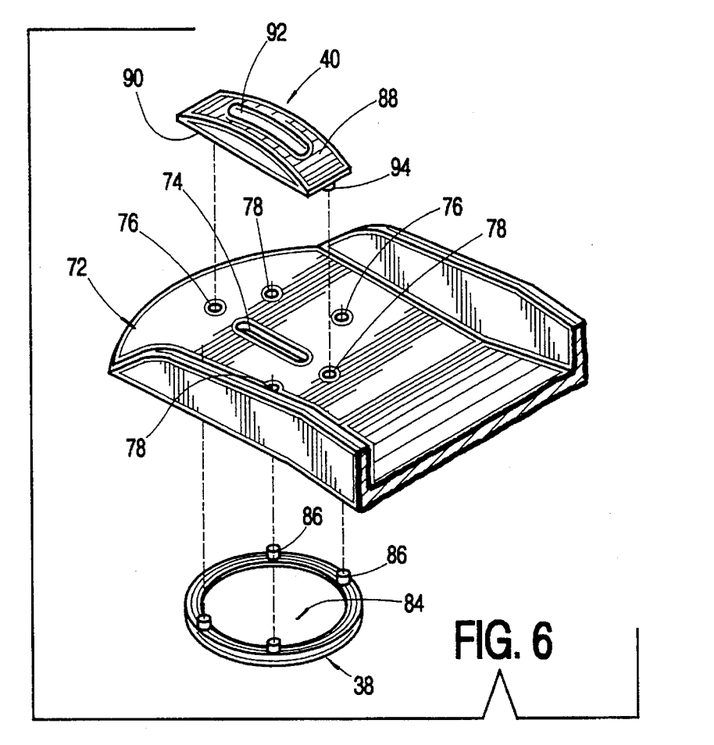
FIG. 6 is an exploded perspective view upside down of the support arm remote end.
Figure 7:
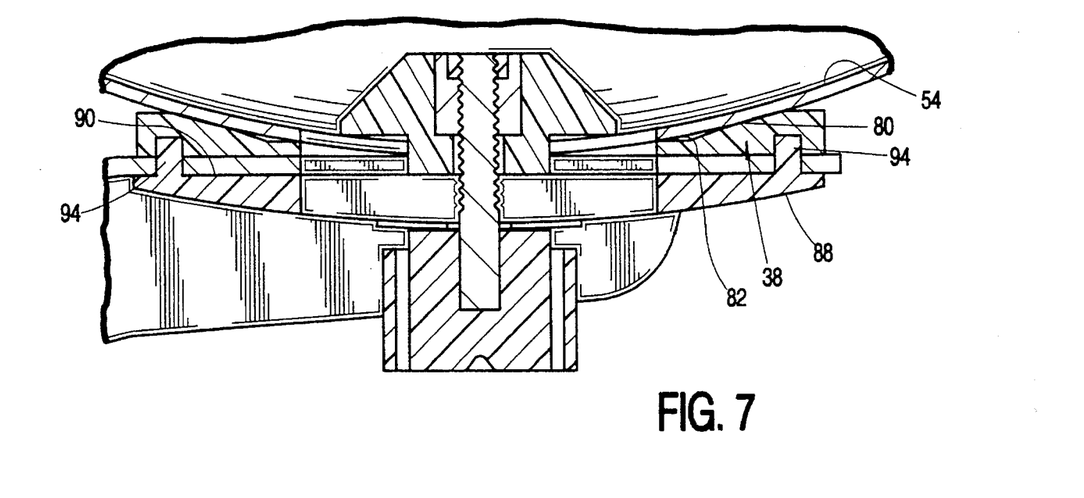
FIG. 7 is a transverse section view through the socket and tray portions of the assembly, showing the components of FIG. 6 in their assembled condition, taken along the line 7—7 of FIG. 4.
Figure 8:
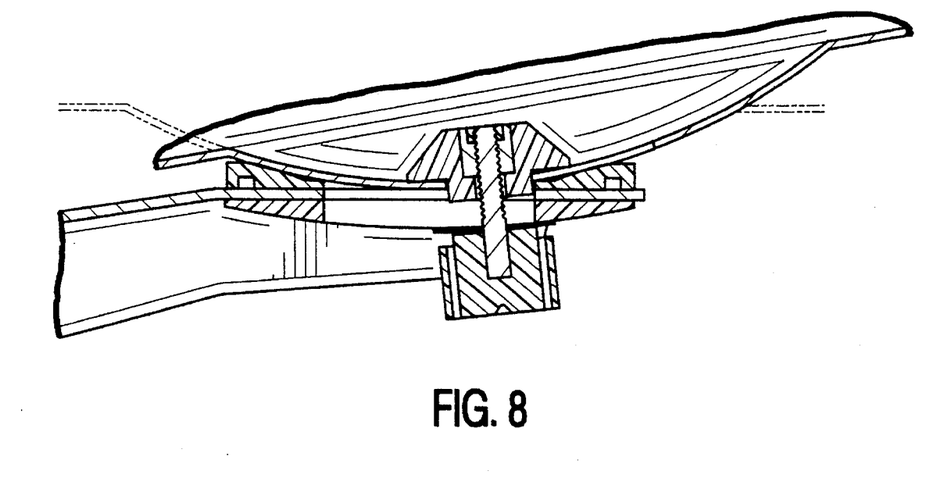
FIG. 8 is a longitudinal section view through the centerline of the monitor support arm remote end shown in a forwardly inclined condition.
Figure 9:
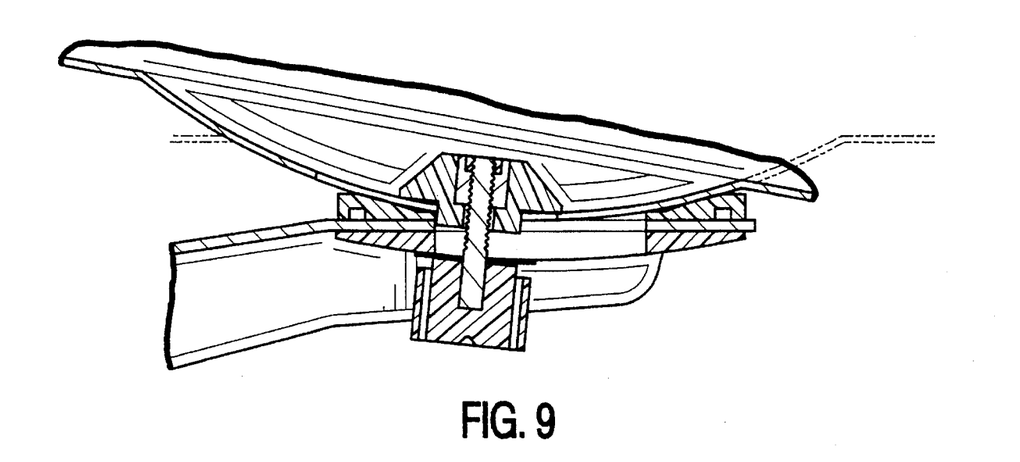
FIG. 9 is a longitudinal section view through the centerline of the monitor support arm remote end shown in a rearwardly inclined condition.

Referring now to FIGS. 2, 6, and 7, the upper, or remote end 60 of the arm 14 is defined by a flat terminal portion 72 through which an elongate through slot 74 extends. Slot 74 is surrounded by six mounting holes, two holes 76 located at the ends of the slot 74, and four holes 78 along the sides of the slot 74. The holes 76, 78 extend through the arm 14.

The socket ring 38 is configured, as best viewed from FIGS. 6 and 7, as having inward beveled surfaces 80 that intersect with a center, flat annular ring portion 82. A central ring hole 84 extends through the flat portion 82 and four dependent posts 86 extend downward from the ring member. The ring member 38 is composed of a suitably hard plastic material, such as nylon.

The friction pad 40 is configured to include an arcuate outer surface 88, a flat underside surface 90, and an elongate through-slot 92 which extends through the pad 40. The friction pad 40 has two dependent posts 94 positioned at opposite ends of the slot 92. The pad 40 is composed of suitable plastic material such as nylon.

A screw shaft 98 of suitable length is connected at one end to a handle portion 96 of the clamping screw 32. The screw shaft diameter is slightly smaller than the width of the slots 92 of the friction pad 40, the slot 74 of the arm portion 72, and the slot 52 of the tray member 12 and of a sufficient length to project through all three slots. The attachment nut 36 can be hand tightened over the free end of the screw shaft 98 to thereby clamp the arm end components together.

Figure 5:
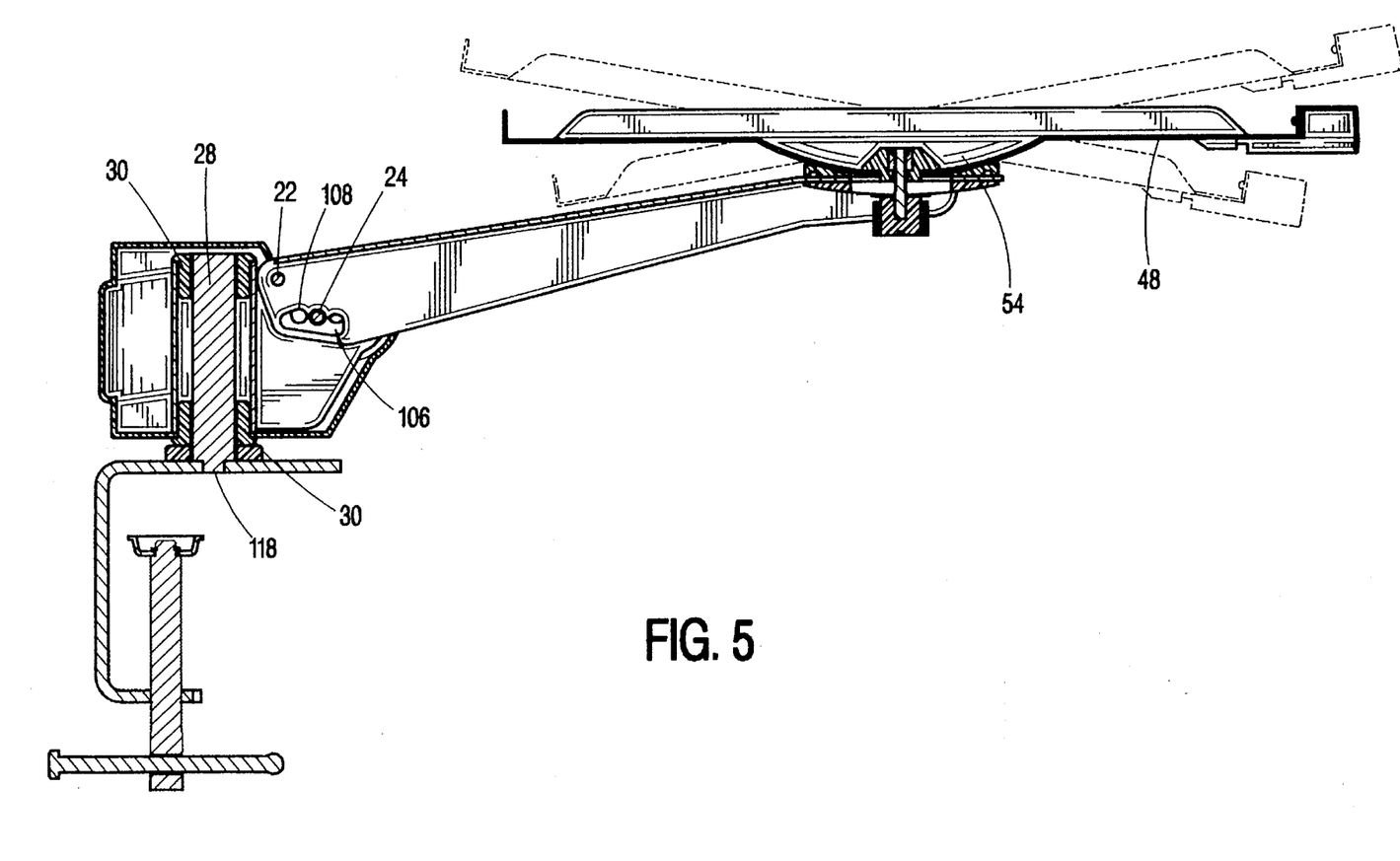
FIG. 5 is a longitudinal section view thereof, taken along the line 5—5 of FIG. 4.

Referring to FIGS. 2,3, and 5, the support bracket 16 comprises a rear plate portion 100, and side wings 102 extending perpendicularly from edges of the plate portion 100 to form a generally U-shaped body. A pair of cut-out apertures 103 are formed at the corners of bracket 16 and a semi-cylindrical tube portion 104 vertically bisects the plate portion 100 and projects outward therefrom. The side wings 102 each have an elongate aperture 106 therethrough defined along a lower edge by a series of lock-pin receiving sockets 108. It will be appreciated that the apertures 106 and sockets 108 are in transverse alignment and are shaped inversely to the apertures 66 and sockets 68 in the arm sideplates 62. The side wings 102 further include dual pivot pin receiving apertures 110 located in mutual alignment and positioned to align with the pivot pin apertures 64 of the arm side plates 62.

Figure 1:
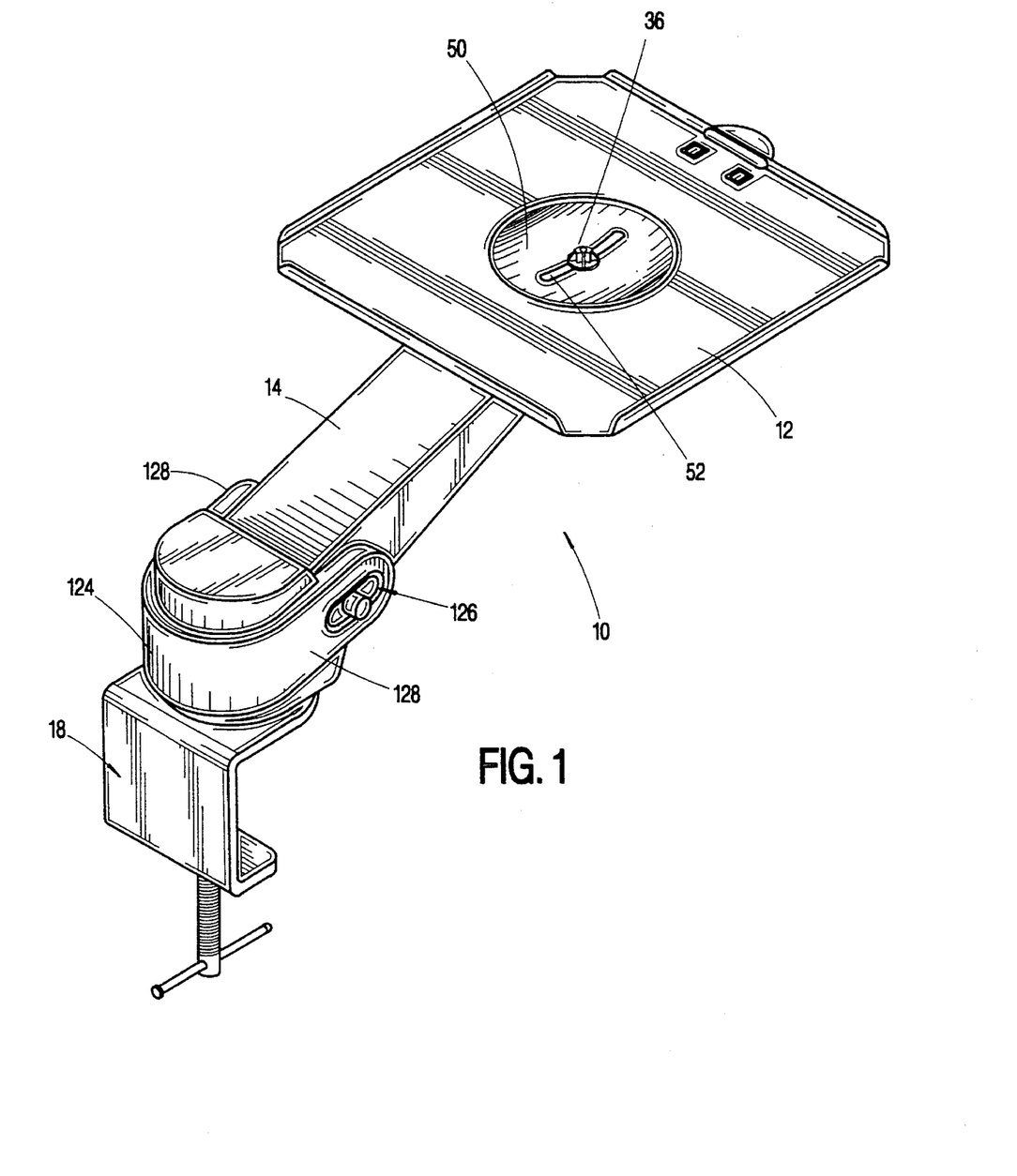
FIG. 1 is a perspective view of the assembled support arm assembly.

The clamping bracket 20 is shaped in mirror image to the rear plate 100 of the support bracket 16. Bracket 20 includes a vertical semi-cylindrical tube portion 112 and side wing portions 114. Each side wing 114 has an outward projecting edge flange 116 dimensioned for insertion into the cutout apertures 103 of bracket 16. The mounting bracket 18 includes a top aperture 120 and a bottom aperture 122 which receives the clamping screw 42 therethrough. As best seen in FIGS. 1 and 3, an outer housing shroud 24 encases the support structure and includes lock pin retention cap slots 126 in opposite side arms 128.

Referring to FIGS. 2, 3, and 5, the assembly of the subject support arm base proceeds as follows. The lower end 58 of the arm 14 is inserted between the side plates 102 of bracket 16 until apertures 64 align with apertures 110. The pivot pin 22 is then inserted through the co-aligned apertures and thereby pivotally connects the lower end of the arm 14 to the bracket 16. So connected, the arm 14 is free to pivot vertically into alternate angular elevations.

The openings 66 of the arm 14 co-align with the apertures 106 of the bracket 16 and the apertures 126 of the shroud 124. The lock pin 24 is inserted through the co-aligned apertures and the end caps 26 are affixed to the ends of pin 24. The pin sockets 68 at the top and the pin sockets 108 cooperate to encircle the lock pin 24 in one of several socket positions. By moving the arm 14 upward, the user may move the pin along the elongate apertures 66, 106, 126 to the desired socket location, and then move the arm 14 down, whereby encircling the pin by sockets 68, 108. When so held, the lock pin 24 prevents further downward rotation of the arm 14 about the pin 22. To release the lock, the arm sockets 68 are moved upward with the arm by the user, thus freeing pin 24 to be moved to a new location within the apertures 66,106,126 and the arm to a new angle of elevation. Thus, the arm may be repositioned vertically about pin 22 and then locked into alternate angular positions by movement of lock pin 24.

The swivel post 28 is captured between the portions 104 of bracket 16 and 112 of bracket 20 as the bracket 20 is fixed to bracket 16 by insertion of the retention flanges 116 into the cut-out apertures 103. The bottom end 118 of the swivel post is inserted through the lower bushing 30 and into the aperture 120 of bracket 18. End 118 is welded in place to bracket 18. The bushing 30 rests upon the top surface of bracket 18 and the lower edges of brackets 16, 20 rest upon the top of bushing 30. The swivel post 118 preferably is welded to bracket 18 before the arm is assembled. The complete arm sub-assembly is slipped down over the post by the end user after purchase.

The upper bushing 30 receives the upper end of the pin 28 therethrough and bushing 30 rests upon the upper edges of brackets 16,20. The upper end of the pin 28 is inserted through an aperture in the shroud (not shown) and welded into place. So assembled, the brackets 16,20 are free to rotate about the swivel pin 28 and thereby reposition the arm 14 three hundred and sixty degrees. The bushings 30 are positioned to prevent the top and bottom edges of brackets 16,20 from rubbing against the top of bracket 18. As such, the bushings 30 provide a bearing surface on the shaft 28, and a bearing surface on bracket 18.

The base assembly described above permits the elevation and rotation of the arm 14 into alternate locations. The bracket 18 clamps to the edge of a work surface or desk to anchor the assembly, and the arm 14 may be moved toward and away from the user, pivoting about swivel pin 28, and/or raised and lowered about pivot pin 22.

Referring next to FIGS. 2,5,6, and 7, the assembly and operation of the monitor tray will now be described. The socket ring 38 is attached to the top surface of arm portion 72 by insertion of posts 86 into the four mounting holes 78. The slot 74 through the arm portion 72 is thereby position to bisect the ring member opening 84. It will be appreciated that the upper surface of the arm portion 72 and the bottom of the ring member in its assembled position are substantially coplanar.

So situated, the ring 38 presents an upwardly open, generally concave socket that receives the lower convex bearing surface 54 of the tray member 12 therein. The bearing surface 54 rests upon the ring surfaces 80,82 and is concentric with the ring 38. Because of the smooth surface of bearing surface 54, the tray member is free to rotate about the ring socket 38 central axis three hundred and sixty degrees, and may also be tilted upward and downward relative to the plane of the ring member 38 and the upper surface of arm portion 72. The slot 52 of the tray member 12 overlaps the slot 74 of the arm portion 72 to a varying degree as the tray bearing surface 54 is rotated into alternate angular and rotational positions.

Positional adjustment of the tray bearing surface 54 relative to the socket 38 causes the surface 44 of the tray member to be correspondingly changed, and the viewing angle to a monitor carried by surface 54 can thereby be adjusted to suit the preference of the user. The degree of tilt and rotation which is desired can simultaneously be achieved by a manual manipulation of the tray member. As the arm member is raised and lowered about pivot pin 22, the angle of the upper surface of arm portion 72 and the socket ring 38 will change relative to horizontal. Accordingly, a user, in order to restore a monitor carried by the tray member and supported by the socket ring 38 to its preferred view angle, will need to make an adjustment. This adjustment is effected by tilting the tray member relative to the socket ring 38 as described above.

The friction pad 40 is mounted to the underside of arm portion 72 by insertion of posts 94 through mounting holes 76. The slot 92 of the pad 40 is substantially identical in shape and dimension to the slot 74 of the arm portion 72. The pad slot 92 accordingly overlaps the slot 74 in its entirety. The washer 34 is positioned against the arcuate surface 88 of the pad 40, and the screw shaft 98 is inserted upwardly through washer 34, the pad slot 92, the arm slot 74, and the tray member slot 52. The nut fastener 36 attaches to the end of the screw shaft 98, and upon tightening, the tray member 12 and ring socket 38 are held in fixed relative alignment. Loosening of the fastener 36 frees the tray member to be repositioned in accordance with the procedure previously described. The nut fastener 36 resides within the cavity 50 of the tray member 12 below the surface 44. Accordingly fastener 36 does not interfere with or otherwise contact the monitor which is positioned upon surface 44.

It will be appreciated that the screw shaft 98 is linear and extends through the slots 92,74, and 52. As the tray member 12 is repositioned, the shaft 98 travels along two or more of these slots. The purpose of the arcuate shaped bottom surface 88 of the friction pad 94 is to alter the direction in which the screw shaft projects as it moves along the slots 92, 74 so that the shaft 98 is always extending perpendicular to the portion of the bearing surface 54 through which it extends. As best seen by FIGS. 5 and 7, the screw shaft 98 will occupy different positions within each of the intersecting slots 52,74, as the tray member 12 is pivoted and tilted within the socket ring 38. The arcuate surface 88 of the pad 94 acts to rotate the longitudinal axis of the screw shaft 98 to compensate for the rotation of components such that, upon reaching the new desired tray position, the fastener 36 can be tightened and the screw will clamp the tray surface 54 to the ring member 38 through the application of a normally directed clamping force.

The angle of intersection of slots 92,74 can be varied to achieve any particular combination of tilt and list of the tray surface 44 desired. If the slots 92,74 are overlapped in a parallel and coplanar alignment, the tray member 12 will tilt in one direction only; that is, along the direction of the aligned slots. However, as the overlapping slots are rotated out of a coplanar orientation, the tray member 12 can be moved in the two directions in which the slots 92,74 are pointed. Because of the radiussed configuration of the bearing surface 54, the movement of the tray surface is rotational in the direction of the slots. Moreover, since the screw shaft is also moving along an arcuate path represented by the pad surface 88, it will achieve a positive clamping of the bearing surface 54 to the ring member 38 no matter what tilt or list attitude the tray member assumes.

Thus, the tray can be leveled when it is rotated 90 degrees, and the monitor is being viewed from the side of the arm. Changing the height setting on the arm causes the angle of the arm to change. Absent a means for leveling the tray, the monitor would list to one side for several of the height settings. The friction pad allows the clamping screw to be tilted so that it is always at 90 degrees to the tray while still having a tangent surface on the pad to clamp to. The arcuate bottom surface 88 of the friction pad thus maintains the clamping screw in a 90 degree orientation relative to the tray and thereby keeps the monitor thereon in a level condition.

From the foregoing, it will be apparent that the subject assembly can achieve repositioning of the tray top surface within a three dimensional envelope by three simple adjustments, each of which operating independently of the other two for maximizing the user's control of the adjustment mechanism. The first adjustment is to the arm elevation by positioning the lock pin 24 in its desired one of the sockets 68,108. The second adjustment is to loosen the fastener 36 and tilt and rotate the tray member 12 into the tilt and list position desired by the user. Finally, the tray 12 may be swiveled toward and away from the user by the swivel mount of pin 28 and brackets 16, 20.

The relatively few number of assembly parts and assembly hardware, and that such components are of conventional construction and design, make the subject assembly economical to produce and assembly. Moreover, the latitude of adjustment provided maximizes the utility of the assembly to the user. Lastly, the ease and wide range of adjustments possible with the subject invention make it easy and convenient to use.

While the above describes the preferred embodiment of the subject invention, the invention is not intended to be so confined. Other embodiments which will be apparent to those skilled in the art and which utilize the teachings herein set forth are intended to be within the scope and spirit of the present invention.

We claim:

1. An adjustable support arm assembly for a computer monitor or the like, comprising:

an arm member having a first end, a remote second end, and an elongate slot extending through the second arm end;

anchor means for supporting the first arm end;

a support socket affixed to an upper surface of the arm second end, the support socket having a central, upwardly opening cavity defined by a support surface, and the socket cavity communicating with the arm member slot;

an adjustable tray rotatably affixed to the support surface, the tray having a dependent concave bearing surface seated within the support cavity and an elongate tray slot extending through the bearing surface and at least partially overlapping the arm member slot, the tray moving within the support socket into variable angular and rotational positions relative to the support pocket;

releasable locking means for fixing the angular and rotational position of the tray relative to the support socket.

2. A support arm assembly according to claim 1, wherein the locking means comprising a pin member having an elongate intermediate portion and an end which extends through the arm slot and the tray slot and a lock fastener attaching to the pin end, whereby clamping the tray and the support plate together.

3. A support arm assembly according to claim 2, wherein the tray has a cavity in an upper surface opposite to the dependent bearing surface, and the lock fastener resides in the tray cavity below the tray upper surface.

4. A support arm assembly according to claim 2, wherein the assembly further comprising a pad member attached to an underside surface of the arm member and having an arcuate shaped bottom surface and an elongate slot extending therethrough aligned with the arm member slot, the pin member extends through the pad slot and has a second pin end that travels across the arcuate pad surface, whereby changing the angle at which the pin member projects through the arm and tray slots.

5. A support arm assembly according to claim 1, wherein the support socket comprising a ring member attached to the arm upper surface and surrounding the arm member slot, and the support surface comprising inwardly directed surfaces of the ring member positioned above the arm member upper surface for supporting the tray bearing surface.

6. A support arm assembly according to claim 5, wherein the tray bearing surface is smooth and continuous thereacross.

7. A support arm assembly according to claim 1, wherein the arm anchor means comprising a pivot pin assembly adapted to facilitate articulating movement of the arm second end into variable and alternate angular positions.

8. A support arm assembly according to claim 7, wherein the anchor means further comprising a swivel post assembly adapted to facilitate rotational movement of the one arm end about a vertical axis.

9. A support arm assembly according to claim 8, wherein the anchor means further comprising a clamp assembly adapted to facilitate fixed attachment of the support arm assembly to an edge of a work surface.

10. An adjustable support arm assembly for a computer monitor or the like, comprising:

an arm member having a first end and a remote second arm end;

anchor means for supporting the first arm end;

a support socket affixed to an upper surface of the arm second end, the socket having a central, upwardly opening cavity defined by inwardly facing support surfaces and a bottom surface, an elongate slot extending through the bottom socket surface;

an adjustable tray having a dependent concave bearing surface seated within the support socket cavity and supported by the support surfaces, and the tray further having an elongate tray slot extending through the bearing surface and at least partially overlapping the support socket bottom surface slot, the tray moving within the socket into variable angular and rotational positions relative to the support socket;

releasable locking means for fixing the angular and rotational position of the tray relative to the support socket.

11. A support arm assembly according to claim 10, wherein the locking means comprising a screw member having an end which extends through the plate slot and the tray slot and a fastener attached to the screw end, whereby clamping the tray and the support plate together.

12. A support arm assembly according to claim 11, wherein the tray has a cavity in an upper surface positioned opposite to the dependent bearing surface, and the fastener resides in the tray cavity below the tray upper surface.

13. A support arm assembly according to claim 11, wherein the assembly further comprising a pad member attached to an underside surface of the arm member and having an arcuate shaped bottom surface and an elongate slot extending therethrough aligned with the arm member slot, the screw member end extends through the friction pad slot and the screw member having a second end that travels across the arcuate pad surface, whereby adjusting and changing the angle at which the screw member projects through the arm and tray slots.

14. A support arm assembly according to claim 13, wherein the tray bearing surface is smooth and continuous thereacross.

15. A support arm assembly according to claim 10, wherein the arm anchor means comprising pivot pin assembly means for facilitating articulating movement of the arm second end into variable and alternate angular positions.

16. A support arm assembly according to claim 15, wherein the anchor means further comprising swivel post assembly means for facilitating rotational movement of the one arm end about a vertical axis.

17. A support arm assembly according to claim 16, wherein the anchor means further comprising clamping means for facilitating fixed attachment of the support arm assembly to an edge of a work surface.

18. An adjustable display surface assembly for positioning a computer monitor into variable and alternate positions about multiple axis of movement, comprising:

a support body having a first end and a second end;

a support socket affixed to an upper surface of the support body second end, the socket having a central upwardly opening cavity defined by inwardly facing support surfaces and a bottom surface;

an elongate slot extending through the bottom socket surface;

an adjustable support tray having a dependent concave bearing surface seated within the support socket cavity supported by the support surfaces, and the tray further having an elongate tray slot extending through the bearing surface and at least partially overlapping the support socket bottom surface slot, the tray moving within the socket into variable angular and rotational positions about intersecting horizontal and vertical axis of movement;

releasable locking means for fixing the angular and rotational position of the tray.

19. A display surface assembly according to claim 18, wherein the locking means comprising a pin member having one end which extends through the socket bottom surface slot and the tray slot and a fastener attaching to the pin end, whereby clamping the tray and support socket together.

20. A display surface assembly according to claim 19, wherein the assembly further comprising a pad member attached to an underside surface of the support body and having an arcuate shaped bottom surface and an elongate slot extending therethrough and aligned with the support body slot, and the pin member extends through the pad member slot and has a second pin member end that travels along the arcuate pad member surface, whereby changing the angle at which the pin member projects through the arm and tray slots.

21. A display surface assembly according to claim 18, wherein the socket cavity is substantially semi-spherical and the tray bearing surface is substantially semi-spherical.

22. A display surface assembly according to claim 21, wherein the support body having means for adjusting the elevational position of the socket cavity independently of the adjustment of the tray.

23. A display surface assembly according to claim 22, wherein the support body having means for adjusting the position of the socket cavity laterally independently of the adjustment of the tray about the intersecting axis of movement and the adjustment of the socket cavity elevation.

\* \* \* \* \*